(12) United States Patent
Hanisch et al.

(10) Patent No.: US 6,394,892 B2
(45) Date of Patent: May 28, 2002

(54) DEVICE FOR MACHINING OPTICAL WORKPIECES

(75) Inventors: Manfred Hanisch, Hüttenberg; Joachim Diehl, Giessen; Holger Schäfer, Weilmünster, all of (DE)

(73) Assignee: Lol Optikmaschinen AG (DE)

( * ) Notice: Subject to any disclaimer, the term of this patent is extended or adjusted under 35 U.S.C. 154(b) by 0 days.

(21) Appl. No.: 09/888,906

(22) Filed: Jun. 25, 2001

(30) Foreign Application Priority Data

Jun. 26, 2000 (DE) .......................................... 100 29 967

(51) Int. Cl.⁷ ................................................ B24B 7/00
(52) U.S. Cl. ........................ 457/259; 451/42; 451/177; 451/179; 451/240; 451/255
(58) Field of Search ................... 451/42, 177, 179, 451/240, 255, 259

(56) References Cited

U.S. PATENT DOCUMENTS

| 4,392,331 A | * | 7/1983 | Schimitzek et al. | .......... 451/43 |
| 6,106,366 A | * | 8/2000 | Dixon et al. | .................. 451/10 |

* cited by examiner

Primary Examiner—Joseph J. Hail, III
Assistant Examiner—Shantese McDonald
(74) Attorney, Agent, or Firm—McAndrews, Held & Malloy, Ltd.

(57) ABSTRACT

A very versatile device is proposed for high-precision machining of optical workpieces, in particular optical lenses, which comprises a horizontally displaceable gantry with at least one vertically displaceable tool spindle and a yoke with workpiece holding means mounted so as to be rotatable about a swivel axis by means of journals fitted on both sides. For swivelling of the yoke without gearing and therefore without backlash, a torque motor is provided concentrically to the swivel axis, which motor is directly connected actively with one of the journals.

18 Claims, 6 Drawing Sheets

DEVICE FOR MACHINING OPTICAL WORKPIECES

BRIEF DESCRIPTION OF THE PRIOR ART

The present invention relates to a device for machining optical workpieces, in particular optical lenses, having a frame, which comprises two side walls, which support a horizontally displaceable gantry with at least one vertically displaceable tool spindle and the space between which takes the form of a machining area, in which a yoke comprising a workpiece holding means is provided, which yoke is mounted on the side walls by means of journals so as to be rotatable about a swivel axis.

Such devices are known from metal working using machine tools, in particular drilling and milling machines (EP 0 712 682 B1). These machines are constructed according to the "gantry" design, i.e. they have a gantry with a cross slide and a vertically disposed tool spindle, which may be displaced horizontally and vertically along two axes. One or more workpiece holders may be arranged in a swivellable yoke arranged beneath the tool spindle. The workpieces are either operated rotationally by means of a spinning table or are merely attached stationarily in the yoke.

It is common to all known machines in which a swivellable yoke is used for the swivelling motion always to be generated by a servo motor via appropriate gearing. In a known machine (DE 36 24 284 C2, FIG. 4), a reducing gear is used to swivel the yoke, a rotary transmission leadthrough with a drive fitted outside the yoke being additionally provided for rotary drive of the workpieces. However, this multi-component, mechanically complex gearing system inevitably exhibits backlash, which has a very disadvantageous effect on the repeatability of the angle to be set. However, angular adjustment precision is very important, in particular in the case of grinding spherical optical surfaces.

The object of the invention is to provide a device for machining optical workpieces which structurally follows the gantry design, but allows high-precision cutting machining even of large optical components with low mechanical complexity even in the event of high process forces and/or varying temperature influences.

SUMMARY OF THE INVENTION

According to the present invention, there is provided a device for machining optical workpieces, in particular optical lenses, having a frame, which comprises two side walls, which support a horizontally displaceable gantry with at least one vertically displaceable tool spindle, there being a space therebetween which takes the form of a machining area, in which a yoke comprising a workpiece holding means is provided, which yoke is mounted on the side walls by means of journals so as to be rotatable about a pivot axis; wherein, to swivel the yoke, a torque motor is provided which is attached to a side wall of the frame concentrically to the swivel axis and is connected actively with the associated journal of the yoke.

Taking as basis the above-stated prior art (EP 0 712 682 B1), claim 1 provides, while avoiding any gear arrangements, a simply constructed device in which no backlash may occur and which therefore allows the achievement of highly and reproducibly precise yoke swivelling movements and thus angular adjustment. The torque motor transmits the swivelling movements directly to the yoke.

If the yoke weight is compensated by counterweights, the torque motor has only to apply a very slight torque in order to bring the entire yoke, with the workpiece holding means/workpiece spindles and the workpieces, into the respective angular position. Only low motor power has therefore to be provided, which is favourable from the point of view of energy consumption and also does not cause excessive heating, which would be detrimental to adjusting and machining precision.

If the counterweights are arranged relative to the side walls of the frame, a narrow, high rigidity yoke is achieved, which in turn benefits machining precision.

The attachment, of a frictionally or interlockingly operating brake allows reliable locking of the yoke in any set angular position, whereby the range of possible geometries which may be produced by the device may be extended. A suitable, pneumatically or hydraulically actuated device may be provided to unlock the brake.

The devices may be such that the journal of the yoke actively connected with the torque motor is mounted in the corresponding side wall of the frame with a swivel bearing on each side of the torque motor and wherein the swivel bearing lying nearest the machining area takes the form of a fixed bearing.

This is an advantageous configuration of the swivel bearing arrangement for the yoke on the bearing journal connected actively with the torque motor. This ensures that, even in the event of heating of the yoke, no axial displacement of the yoke and thus of the workpiece holding means/workpiece spindles relative to the tool spindle may occur as a result of thermal expansion. Possible thermal expansion in the journal area is thus unable to spread into the machining area of the device, a fact which is conducive to the achievement of high machining precision. However, this thermosymmetrical construction of the device not only provides considerable advantages in the thermal respect but also with regard to the stability of the machine structure relative to the deformation tendencies caused by process forces. The construction according to the invention of the device also allows the area of the swivel bearings to be specifically temperature-controlled by water cooling, in particular in the area of the torque motor.

The swivelling movements performed by the yoke may be detected and controlled by a high-resolution rotary transducer. This direct detection of the angle of rotation allows high control quality and thus likewise serves in achieving the desired high machining precision.

A horizontal slide for two tool spindles is preferably provided on the horizontally displaceable gantry, which two spindles may be displaced independently of one another in the vertical direction in particular for optional rough or fine machining of the workpiece. The mutually independent displaceability of the two tool spindles is beneficial to the desired very narrow yoke construction, because the tool spindle not required at any one time may be moved upwards out of collision range. The narrower the yoke, the more rigidly it may be constructed, to allow high machining precision. However, this construction also allows simple cross-grinding adjustment without any additional adjusting means via the available CNC movement axis of the horizontal slide.

A workpiece loading means may be provided, which is vertically displaceable together with the tool spindle and shares in the CNC-controlled movements of the relevant tool spindle and therefore advantageously does not require any additional CNC axes.

The workpiece holding means can comprise two workpiece spindles with the axes of rotation lying in a plane with the swivel axis of the yoke. Of particular advantage is the position of the axes of rotation of the two tool spindles relative to the swivel axis of the yoke, because the centre of the workpiece thereby substantially remains in the area of the swivel axis. The very short lever ratios thereby allowed offer considerable advantages for the precision of angular positioning.

To reduce device idle times a tool changer may be arranged between the side walls of the frame, which tool changer may be displaced parallel to the gantry and with which a replacement tool may be brought very rapidly into the machining area of the device.

Given the aim of achieving as high as possible a degree of machining precision, it is advantageous for the frame to consist of polymer concrete, since this allows better vibration damping, less influencing of the temperature and active temperature control of the machine frame.

BRIEF DESCRIPTION OF THE DRAWINGS

Further details of the invention are described in more detail below with reference to the drawings, which schematically represent an exemplary embodiment and in which.

DESCRIPTION OF THE PREFERRED EMBODIMENT

The device revealed in the drawings takes the form of a CNC-controlled grinding machine in particular for surface and edge-grinding of optical lenses L. The device has a frame 1 moulded from polymer concrete with two horizontally spaced side walls 2, on the upper surfaces of which there are attached guide rails 3 extending horizontally and parallel to one another. A gantry 4 displaceable horizontally in both directions of a Y-axis is mounted slidably on the two guide rails 3. As is clear from FIG. 4, sliding of the gantry 4 is effected by means of a roller ball spindle 5 attached stationarily to the frame 1 and a hollow shaft servo motor 6 engaging non-interlockingly therewith and fitted in the gantry 4. The space between the side walls 2 forms a machining area 7, in which tools act on the lenses L in a manner still to be described. Two tool spindles 8 displaceable vertically in both directions of a Z-axis are provided on the gantry 4 likewise in a manner still to be described.

In the machining area 7 there is located a U-shaped yoke 9, which carries on its web portion 10 a workpiece holding means 11, which will be described in greater detail. Journals 13 pointing outwards and arranged in mutual coaxial alignment are attached to each of the branches 12 of the yoke 9, as is shown best by FIG. 6. These journals 13 serve to mount the yoke 9 on the side walls 2 rotatably about a swivel axis A. To swivel the yoke 9 about the swivel axis A, a torque motor 14 is provided which is attached to a side wall 2 of the frame 1 concentrically to the swivel axis A and is connected actively with the associated journal 13 of the yoke 9, i.e. may move this journal 13 and thus the entire yoke 9 with the workpiece holding means 11 in both directions of rotation non-interlockingly and rotationally in accordance with control signals. To this end, the torque motor 14 has, according to FIG. 6, a stator S mounted non-rotatably in the right-hand side wall 2 and a rotor R fitted non-rotatably on the journal 13 of the yoke 9. It is clear that the torque motor 14 is actively connected directly, i.e. without gearing, with the associated journal 13 of the yoke 9. Like the Y-axis and the Z-axis, the swivel axis A is also CNC-controlled.

Figure 6:
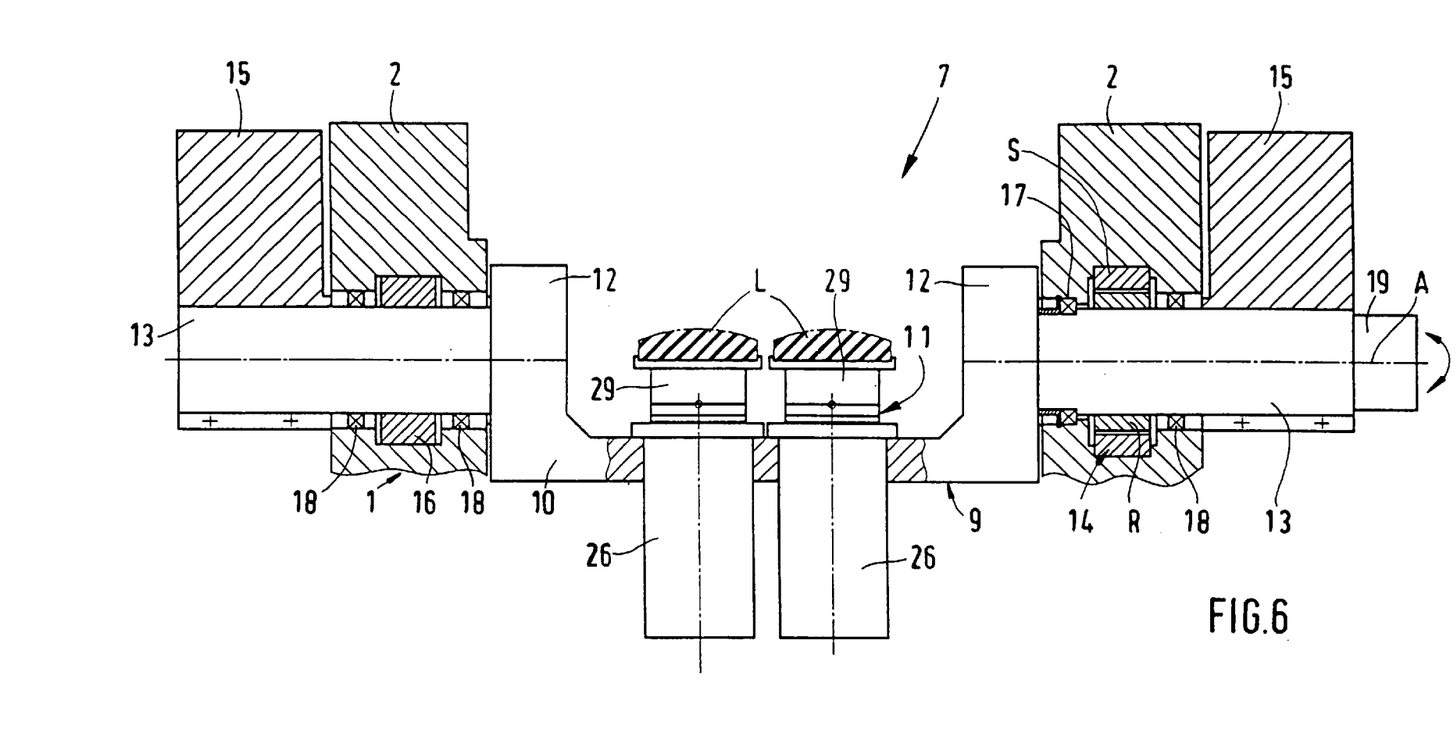

Counterweights 15 are attached, non-rotatably relative to the yoke 9, to both journals 13 of the yoke 9 on the sides remote from the machining area, i.e. outside the side walls 2 of the frame 1. These generate a torque at the journals 13, which counteracts the torque generated by the yoke 9 and the holding means 11, substantially compensating the latter.

For certain machining processes, the yoke 9 may preferably be locked in its particular swivel position by means of a frictional or interlocking brake 16, which may be spring pre-tensioned. In the exemplary embodiment illustrated, the brake 16 is attached to the opposite side wall 2 from the torque motor 14, as revealed by FIG. 6. To unlock the brake, a suitable pneumatically or hydraulically actuated device (not shown) is provided.

As FIG. 6 also shows, the journal 13 of the yoke 9 connected actively with the torque motor 14 is mounted rotatably in the corresponding side wall 2 of the frame 1 with a swivel bearing on each side of the torque motor 14. On the motor side, the swivel bearing 17 nearest the machining area 7 takes the form of a fixed bearing and the outer swivel bearing 18 takes the form of a movable bearing. The other journal 13 of the yoke 9 is mounted rotatably in the other side wall 2 with a swivel bearing 18 in the form of a movable bearing on each side of the brake 16.

The swivel movements of the yoke 9 may be controlled on the basis of signals, which may be detected by means of a high-resolution rotary transducer 19, which is arranged on the swivel axis A of the yoke 9, in the example illustrated externally on the motor-side journal 13 of the yoke 9 (FIG. 6).

Figure 1:
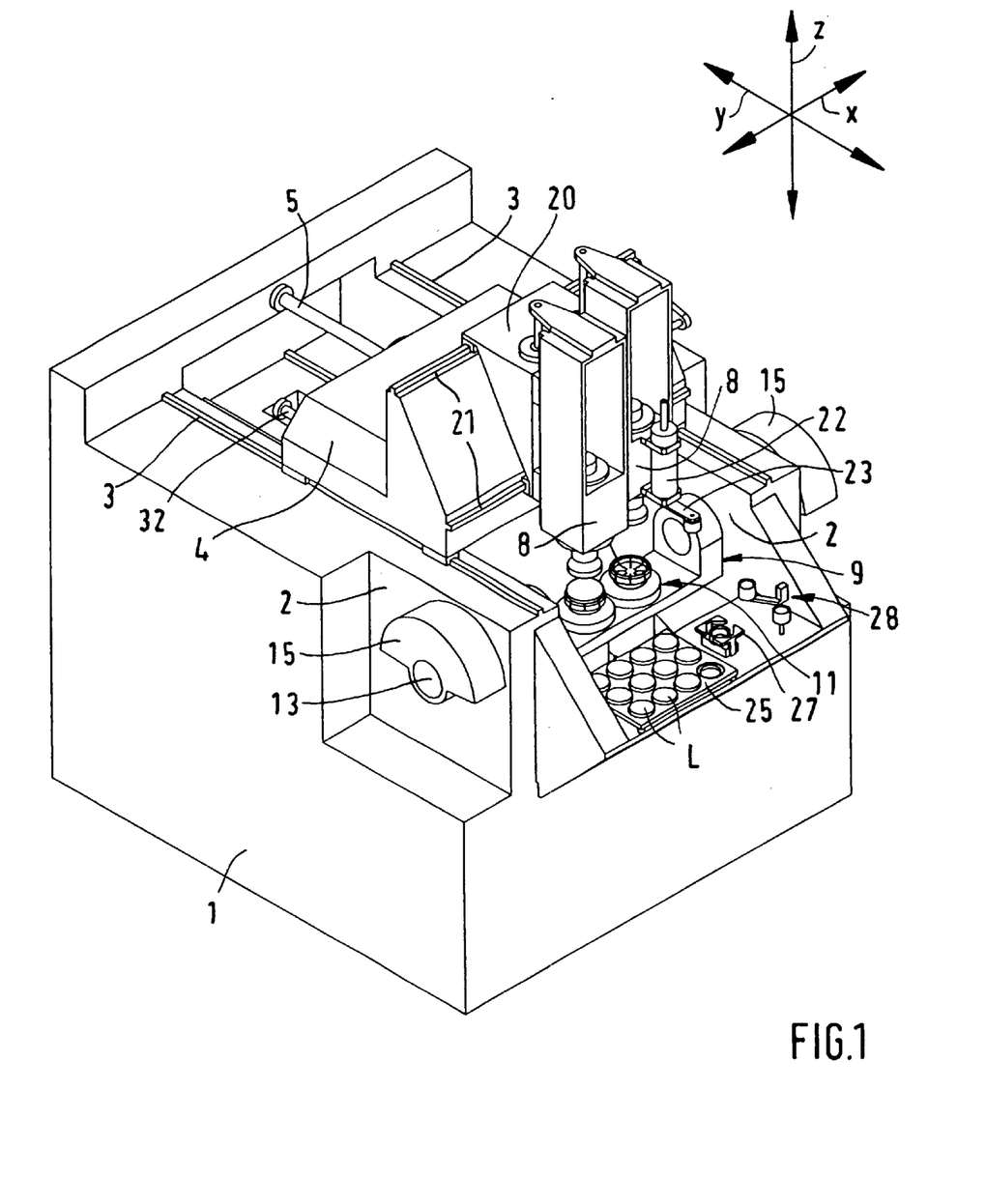
FIG. 1 is a perspective view of the device from the front/above.
Figure 4:
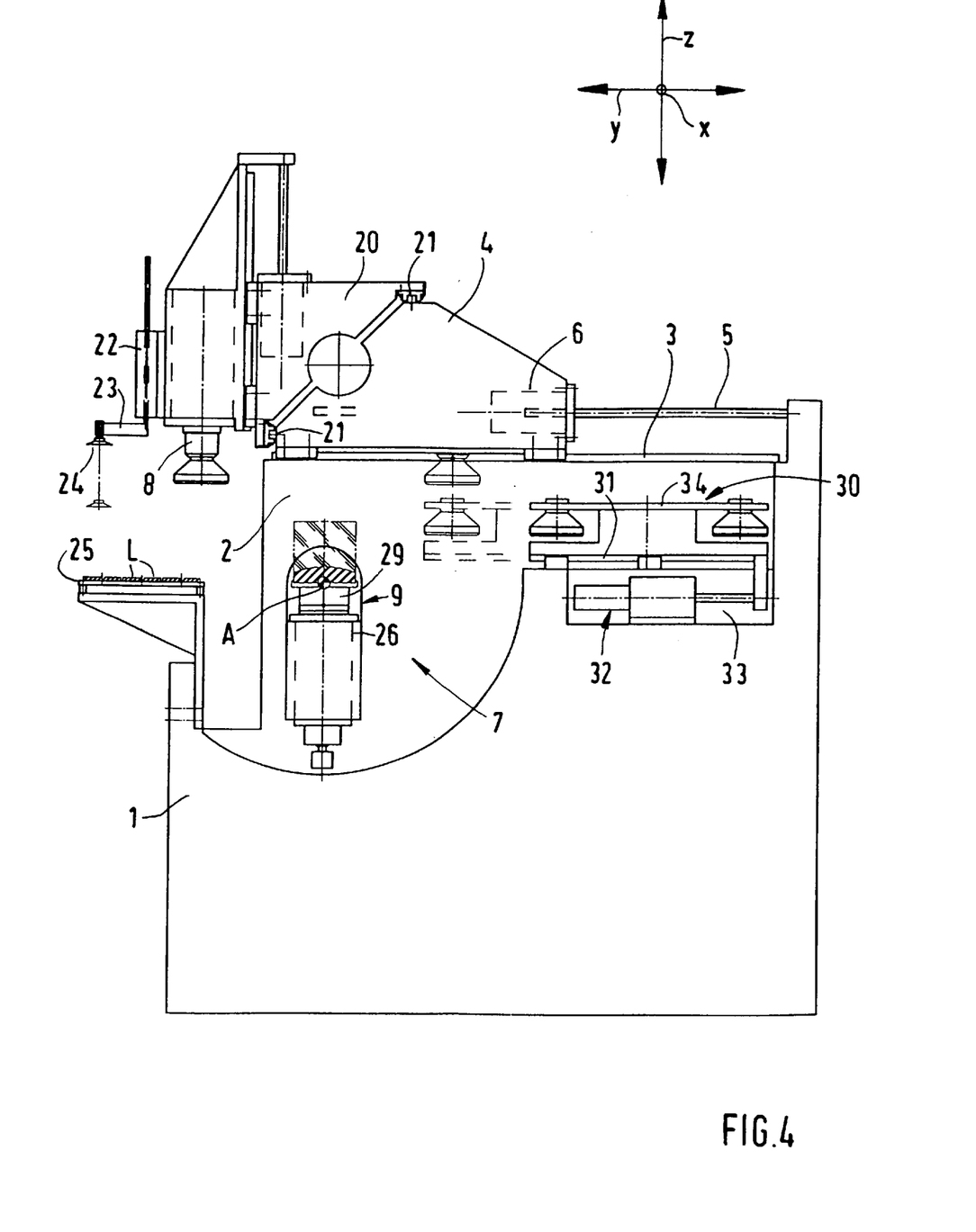
FIG. 4 shows a section through the device along the section line VI—VI in FIG. 3.
Figure 5:
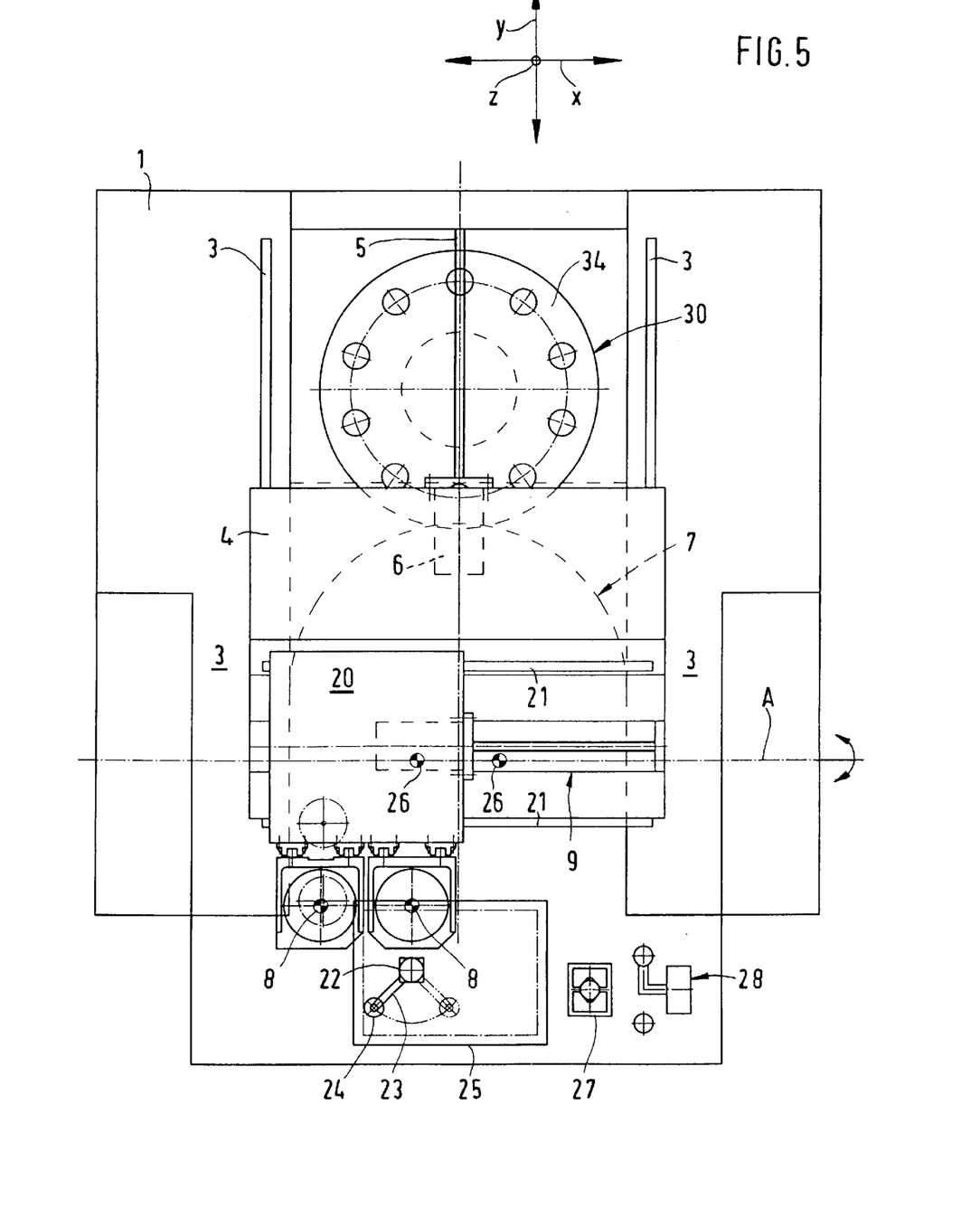
FIG. 5 is a plan view of the device and FIG. 6 is a broken-away and partially broken-open longitudinal section substantially through the yoke and the associated parts.

It is clear from FIGS. 1, 4 and 5 that a horizontal slide 20 may be displaced on the gantry 4 on mutually parallel guide rails 21 attached horizontally on the gantry 4. The gantry 4 and the horizontal slide 20 form a cross-slide arrangement, in which the horizontal slide 20 may be displaced in both directions of an X-axis, which extends perpendicularly to the Y-axis of the gantry 4. The movements on the X-axis are also CNC-controlled.

Two tool spindles 8 are provided on the horizontal slide 20, which spindles 8 may be displaced vertically along the Z-axis independently of one another in particular for optional rough or fine machining of the workpiece.

A workpiece loading means visible in FIGS. 1, 4 and 5, which allows automatic workpiece change-over, consists of a cylinder 22 attached to the spindle head of a tool spindle 8 and a loading arm 23 with suction cup 24, which loading arm 23 may be moved up and down and swivelled by the cylinder 22. The loading means may be displaced vertically along the Z-axis together with the relevant tool spindle 8.

The loading means may, for example, transport lenses L from a pallet store 25 or the like to the respective workpiece spindle 26, of which the holding means 11 on the web part 10 of the yoke 9 comprises two (FIG. 6). It is additionally possible to insert the lens into a centring station 27 and also into a reversing station 28 by means of the loading means. The lens is removed in the reversed position from the reversing station 28 and inserted into a workpiece receptacle 29 attached to the workpiece spindle 26 for machining of its rear.

Of particular advantage in this design of the device is that no additional CNC-controlled axes are required for the movements of the loading arm 23. The two horizontal X and Y CNC axes thus allow fully automated workpiece change-over with little additional effort with the aid of the additional pneumatic cylinder 22.

Since the axes of rotation of the two workpiece spindles 26 lie in a plane with the swivel axis A of the yoke 9, the centre of the workpiece remains substantially in the area of the swivel axis A.

Figure 2:
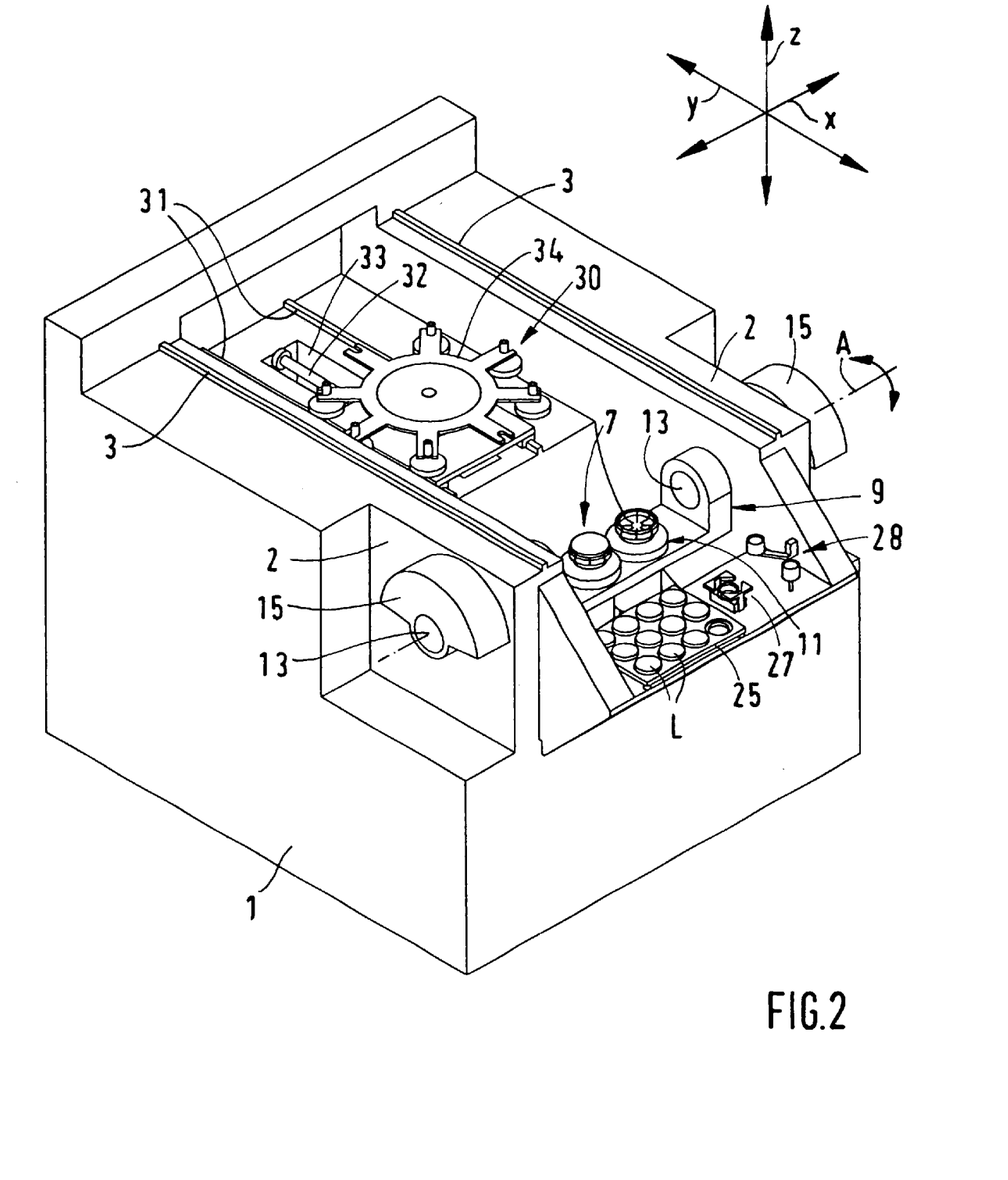
FIG. 2 is a perspective view, corresponding to the view according to FIG. 1, from the front/above, but without the gantry and the horizontal slide.
Figure 3:
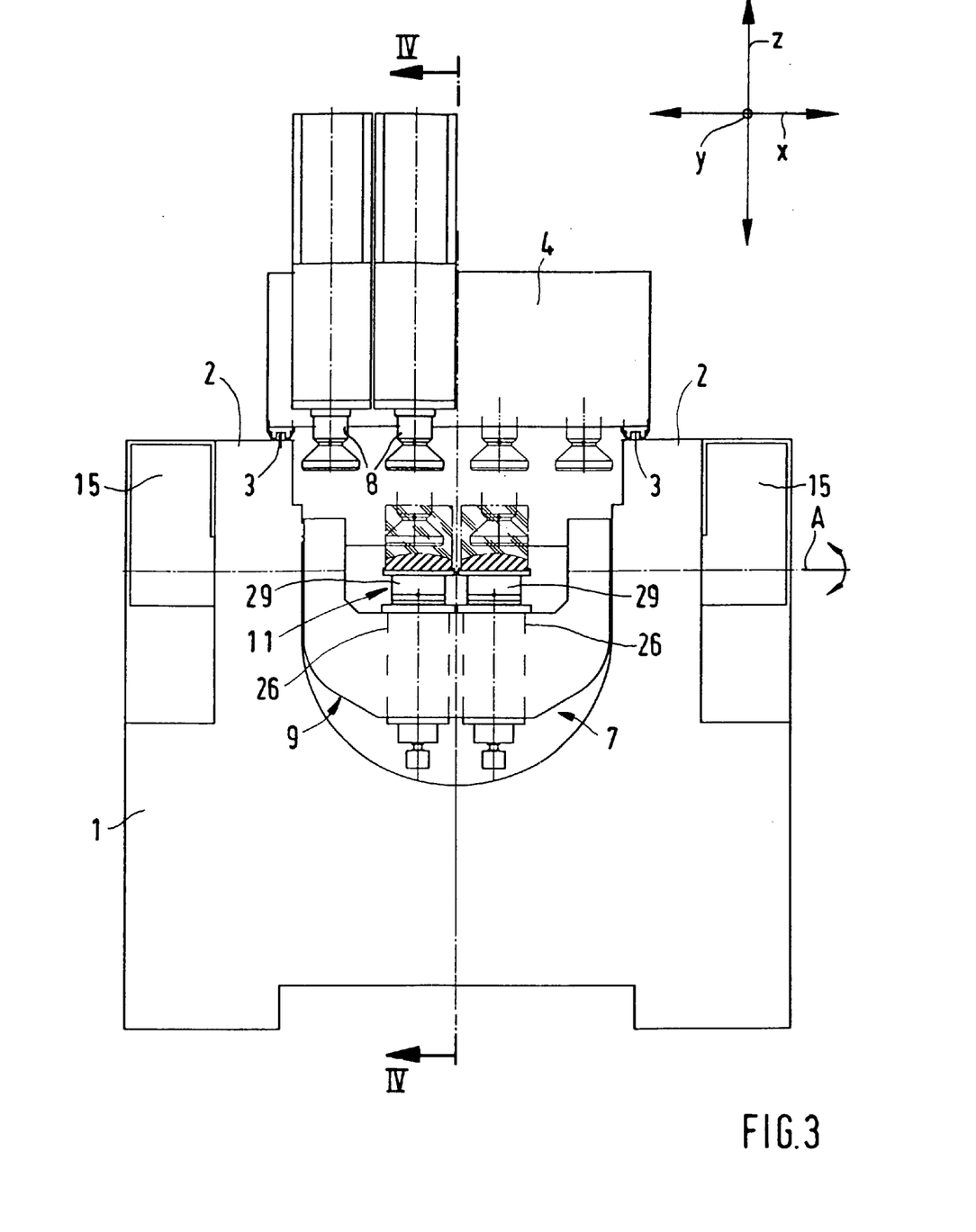
FIG. 3 is a front view of the device.

A tool changer 30 is arranged between the side walls 2 of the frame, which tool changer 30 may be displaced parallel to the guide rails 3 of the gantry 4. The tool changer 30 may also be displaced on guide rails 31 which are attached to the frame 1 parallel to the guide rails 3 of the gantry 4, as is clearest from FIG. 2 and FIG. 4 together. Sliding drive of the tool changer 30 proceeds by means of a hydraulic or pneumatic cylinder/piston arrangement 32 acting thereon, which is arranged in a recess 33 in the frame 1. A replacement tool may be moved into the machining area 7 very quickly by means of the tool changer 30. A carrousel store 34 belonging to the tool changer 30 may be appropriately indexed for the purpose of tool change-over, wherein the horizontal slide 20 with the respective tool spindle 8 may be positioned above the replacement tool or the tool to be replaced in the carrousel store 34. This arrangement allows very rapid tool change-over, because no long horizontal paths have to be travelled with the heavy cross-slide arrangement consisting of gantry 4 and horizontal slide 20. The tool changer 30 allows even very complex workpieces with different geometries to be machined with relatively little effort.

The above description is of an exemplary embodiment having two tool spindles 8, but it is also possible to use just one tool spindle 8 for example to machine very large workpieces. The same applies to the number of workpiece spindles 26, i.e. the fitting of just one workpiece spindle 26 on the yoke 9 is possible, e.g. for machining large lenses with a diameter of 300 mm and more. To machine complex flat optical or hybrid optical components, it is possible, for example, for the workpiece to be highly precisely positioned using this one workpiece spindle 26, while individual flat surfaces are produced by means of cup or disk grinding tools or other tools. The use of disk milling cutters or cutter heads in the "flycutting" process is also possible, in order for example to produce inserts for injection moulds of metal by means of the device. Apart from the machining of such casting moulds or glass lenses and moulds, the device may also be used to machine polishing compression moulds of silicon carbide or ceramic drop-plate-type moulding substrates.

Due to the kinematic conditions of the device according to the invention, it is possible, in addition to spherical and flat optics, to machine aspheres, toroidal surfaces and also aspheres which are not rotationally symmetrical (atoroidal or progressive surfaces) as well as freeform surfaces. The device may operate both with cup grinding tools and in single point mode (as described for example in DE 195 29 786 C1 in the name of the applicant). Disk grinding tools may operate according to the principle of rotary circumferential cross grinding or longitudinal grinding.

A very versatile device is proposed for high-precision machining of optical workpieces, in particular optical lenses, which comprises a horizontally displaceable (Y-axis) gantry with at least one vertically displaceable (Z-axis) tool spindle and a yoke with workpiece holding means mounted so as to be rotatable about a swivel axis A by means of journals fitted on both sides. For swivelling of the yoke without gearing and therefore without backlash, a torque motor is provided concentrically to the swivel axis A, which motor is directly connected actively with one of the journals.

We claim:

1. A device for machining optical workpieces, in particular optical lenses, having a frame, which comprises two side walls, which support a horizontally displaceable gantry with at least one vertically displaceable tool spindle, there being a space therebetween which takes the form of a machining area, in which a yoke comprising a workpiece holding means is provided, which yoke is mounted on the side walls by means of journals so as to be rotatable about a pivot axis; wherein, to swivel the yoke, a torque motor is provided which is attached to a side wall of the frame concentrically to the swivel axis and is connected actively with the associated journal of the yoke.

2. A device according to claim 1, wherein counterweights are attached to the journals of the yoke, which counterweights generate a torque at the journals, which counteracts the torque generated by the yoke.

3. A device according to claim 2, wherein the counterweights are arranged on the sides of the side walls of the frame remote from the machining area.

4. A device according to claim 1, wherein the yoke may be locked in its particular swivel position by means of a frictional or interlocking brake, which is attached to the opposite side wall from the torque motor.

5. A device according to claim 1, wherein the journal of the yoke actively connected with the torque motor is mounted in the corresponding side wall of the frame with a swivel bearing on each side of the torque motor and wherein the swivel bearing lying nearest the machining area takes the form of a fixed bearing.

6. A device according to claim 1, wherein the swivelling movement of the yoke is controlled on the basis of signals, which are detected by means of a rotary transducer arranged on the swivel axis of the yoke.

7. A device according to claim 1, wherein a horizontal slide for two tool spindles is provided on the gantry, which slide is displaceable in the direction perpendicular to the direction of movement of the gantry and which tool spindles are displaced independently of one another in the vertical direction, in particular for optional rough or fine machining of the workpiece.

8. A device according to claim 1 and comprising a workpiece loading means, which is displaced in the vertical direction together with the tool spindle.

9. A device according to claims 1, wherein the workpiece holding means comprises two workpiece spindles, the axes of rotation of which lie in a plane with the swivel axis of the yoke.

10. A device according to claim 1, wherein a tool changer is arranged between the side walls of the frame, which tool changer is displaceable parallel to the gantry.

11. A device according to claim 1, wherein the frame consists of polymer concrete.

12. A device for machining optical workpieces, in particular optical lenses, having a frame, which comprises two side walls, which support a horizontally displaceable gantry with at least one vertically displaceable tool spindle, there being a space therebetween which takes the form of a machining area, in which a yoke comprising a workpiece holding means is provided, which yoke is mounted on the side walls by means of journals so as to be rotatable about a pivot axis; wherein a horizontal slide for two tool spindles is provided on the gantry, which slide is displaceable in the direction perpendicular to the direction of movement of the gantry and which tool spindles are displaced independently of one another in the vertical direction, in particular for optional rough or fine machining of the workpiece.

13. A device according to claim 12, and comprising a workpiece loading means, which is displaced in the vertical direction together with the tool spindle.

14. A device according to claim 12, wherein a tool changer is arranged between the side walls of the frame, which tool changer is displaceable parallel to the gantry.

15. A device according to claim 12, wherein the frame consists of polymer concrete.

16. A device for machining optical workpieces, in particular optical lenses, having a frame, which comprises two side walls, which support a horizontally displaceable gantry with at least one vertically displaceable tool spindle, there being a space therebetween which takes the form of a machining area, in which a yoke comprising a workpiece holding means is provided, which yoke is mounted on the side walls by means of journals so as to be rotatable about a pivot axis; wherein the workpiece holding means comprises two workpiece spindles, the axes of rotation of which lie in a plane with the swivel axis of the yoke.

17. A device according to claim 16, wherein a tool changer is arranged between the side walls of the frame, which tool changer is displaceable parallel to the gantry.

18. A device according to claim 16, wherein the frame consists of polymer concrete.

* * * * *